(12) United States Patent
Newman et al.

(10) Patent No.: US 11,451,955 B2
(45) Date of Patent: Sep. 20, 2022

(54) V2X AND VEHICLE LOCALIZATION BY LOCAL MAP EXCHANGE IN 5G OR 6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: AUTONOMOUS ROADWAY INTELLIGENCE, LLC, Palos Verdes (CA)

(*) Notice: Subject to any disclaimer, the term of this patent is extended or adjusted under 35 U.S.C. 154(b) by 0 days.

(21) Appl. No.: 17/582,243

(22) Filed: Jan. 24, 2022

(65) Prior Publication Data
US 2022/0157171 A1    May 19, 2022

Related U.S. Application Data

(60) Provisional application No. 63/260,814, filed on Sep. 1, 2021, provisional application No. 63/243,437, filed
(Continued)

(51) Int. Cl.
| | |
|---|---|
| *H04W 8/26* | (2009.01) |
| *G06K 19/06* | (2006.01) |
| *H04W 4/029* | (2018.01) |
| *H04W 4/90* | (2018.01) |
| *H04W 4/40* | (2018.01) |

(Continued)

(52) U.S. Cl.
CPC ............. *H04W 8/26* (2013.01); *G01S 5/0063* (2013.01); *G01S 19/256* (2013.01); *G06K 19/06037* (2013.01); *G08G 1/017* (2013.01); *G08G 1/0145* (2013.01); *G08G 1/04* (2013.01); *G08G 1/056* (2013.01); *G08G 1/091* (2013.01); *G08G 1/137* (2013.01); *G08G 1/161* (2013.01); *G08G 1/162* (2013.01); *G08G 1/166* (2013.01); *G08G 1/167* (2013.01); *H04W 4/029* (2018.02);
(Continued)

(58) Field of Classification Search
CPC ........ G08G 1/161; G08G 1/166; G08G 1/167; H04W 4/46
See application file for complete search history.

(56) References Cited

U.S. PATENT DOCUMENTS

| | | |
|---|---|---|
| 8,520,695 B1 | 8/2013 | Rubin |
| 2008/0059050 A1 | 3/2008 | Lin |

(Continued)

*Primary Examiner* — Michael V Kerrigan
(74) *Attorney, Agent, or Firm* — Mayer & Williams PC

(57) ABSTRACT

Autonomous vehicles may communicate with each other in 5G or 6G to avoid hazards, mitigate collisions, and facilitate the flow of traffic. However, for cooperative action, each vehicle must determine the wireless address of other vehicles in proximity, so that they can communicate directly with each other. It is not sufficient to know the wireless address alone; the wireless address must be associated with an actual vehicle in view. Methods disclosed herein enable vehicles to exchange messages that specify the distances and angles of other vehicles in view. Then, each vehicle compares the other vehicle's measurements with its own, along with each vehicle's wireless address. Using an AI-based map-merging algorithm, one or more vehicles can produce a full traffic map from the fragmentary local maps of each vehicle's viewpoint.

17 Claims, 10 Drawing Sheets

Related U.S. Application Data on Sep. 13, 2021, provisional application No. 63/245,227, filed on Sep. 17, 2021, provisional application No. 63/246,000, filed on Sep. 20, 2021, provisional application No. 63/256,042, filed on Oct. 15, 2021, provisional application No. 63/271,335, filed on Oct. 25, 2021, provisional application No. 63/272,352, filed on Oct. 27, 2021, provisional application No. 63/287,428, filed on Dec. 8, 2021, provisional application No. 63/288,237, filed on Dec. 10, 2021, provisional application No. 63/288,807, filed on Dec. 13, 2021, provisional application No. 63/290,731, filed on Dec. 17, 2021.

(51) Int. Cl.

| | | |
|---|---|---|
| *G01S 5/00* | (2006.01) | |
| *G01S 19/25* | (2010.01) | |
| *H04W 4/46* | (2018.01) | |
| *G08G 1/01* | (2006.01) | |
| *G08G 1/017* | (2006.01) | |
| *G08G 1/04* | (2006.01) | |
| *G08G 1/056* | (2006.01) | |
| *G08G 1/09* | (2006.01) | |
| *G08G 1/137* | (2006.01) | |
| *G08G 1/16* | (2006.01) | |

(52) U.S. Cl.
CPC ............... *H04W 4/40* (2018.02); *H04W 4/46* (2018.02); *H04W 4/90* (2018.02)

(56) References Cited

U.S. PATENT DOCUMENTS

| | | |
|---|---|---|
| 2010/0177681 A1 | 7/2010 | Sahinoglu |
| 2010/0256852 A1 | 10/2010 | Mudalige |
| 2013/0203400 A1 | 8/2013 | Ricci |
| 2016/0077213 A1 | 3/2016 | Xianglin |
| 2017/0018187 A1 | 1/2017 | Kim |
| 2017/0146660 A1 | 5/2017 | Xu |
| 2017/0176599 A1 | 6/2017 | Hay |
| 2017/0212510 A1 | 7/2017 | Nordbruch |
| 2017/0285176 A1 | 10/2017 | Croyle |
| 2018/0113472 A1 | 4/2018 | Sakr |
| 2018/0160419 A1 | 6/2018 | Jiang |
| 2018/0208140 A1 | 7/2018 | Sugimoto |
| 2018/0328734 A1 | 11/2018 | Kasslatter |
| 2019/0069051 A1 | 2/2019 | Al-Stouhi |
| 2019/0094385 A1 | 3/2019 | Laurichesse |
| 2019/0239040 A1 | 8/2019 | Va |
| 2020/0041604 A1 | 2/2020 | Kim |
| 2020/0178039 A1 | 6/2020 | Lee |
| 2020/0336541 A1 | 10/2020 | Naderi Alizadeh et al. |
| 2020/0396782 A1* | 12/2020 | Russell ............... H04L 67/12 |
| 2021/0018630 A1 | 1/2021 | Mueller |
| 2021/0096215 A1 | 4/2021 | Slobodyanyuk |
| 2021/0132233 A1 | 5/2021 | Govindillam |
| 2021/0150895 A1 | 5/2021 | Huang |
| 2021/0286044 A1 | 9/2021 | Knuuttila |
| 2021/0306682 A1 | 9/2021 | Ucar |
| 2021/0318450 A1 | 10/2021 | Tomita |
| 2021/0377760 A1 | 12/2021 | Guo |
| 2022/0005353 A1* | 1/2022 | Hwang ............... H04W 4/38 |

\* cited by examiner

V2X AND VEHICLE LOCALIZATION BY LOCAL MAP EXCHANGE IN 5G OR 6G

PRIORITY CLAIMS AND RELATED APPLICATIONS

This application claims the benefit of U.S. Provisional Patent Application Ser. No. 63/260,814, entitled "Localization and Identification of Vehicles in Traffic by 5G Messaging", filed Sep. 1, 2021, and U.S. Provisional Patent Application Ser. No. 63/243,437, entitled "V2X Messaging in 5G with Simultaneous GPS Reception", filed Sep. 13, 2021, and U.S. Provisional Patent Application Ser. No. 63/245,227, entitled "V2X with 5G Image Exchange and AI-Based Viewpoint Fusion", filed Sep. 17, 2021, and U.S. Provisional Patent Application Ser. No. 63/246,000, entitled "V2X Connectivity Matrix with 5G Sidelink", filed Sep. 20, 2021, and U.S. Provisional Patent Application Ser. No. 63/256,042, entitled "Hailing Procedure for V2R, V2V and V2X Initial Contact in 5G", filed Oct. 15, 2021, and U.S. Provisional Patent Application Ser. No. 63/271,335, entitled "Semaphore Messages for Rapid 5G and 6G Network Selection", filed Oct. 25, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/287,428, entitled "V2X and Vehicle Localization by Local Map Exchange in 5G/6G", filed Dec. 8, 2021, and U.S. Provisional Patent Application Ser. No. 63/288,237, entitled "V2X with 5G/6G Image Exchange and AI-Based Viewpoint Fusion", filed Dec. 10, 2021, and U.S. Provisional Patent Application Ser. No. 63/288,807, entitled "V2X Messaging in 5G/6G with Simultaneous GPS Reception", filed Dec. 13, 2021, and U.S. Provisional Patent Application Ser. No. 63/290,731, entitled "Vehicle Connectivity, V2X Communication, and 5G/6G Sidelink Messaging", filed Dec. 17, 2021, all of which are hereby incorporated by reference in their entireties.

FIELD OF THE INVENTION

The invention relates to systems and methods for short-range locating and identification of vehicles in traffic.

BACKGROUND OF THE INVENTION

Autonomously operated vehicles are expected to cooperate with other vehicles, in order to avoid collisions and generally facilitate the flow of traffic. However, intervehicle cooperation is possible only if each vehicle can determine the wireless address of each other vehicle in proximity. Without knowing which vehicle has which wireless address, they cannot send a message to another specific vehicle, nor determine which vehicle has sent a message.

What is needed is means for determining the wireless address of each proximate vehicle in traffic, so that they can communicate for traffic management and collision avoidance.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a first vehicle to communicate with a second vehicle, the second vehicle proximate to a third vehicle, the method comprising: measuring a first plurality of angles, the first plurality of angles comprising an angle of the second vehicle and an angle of the third vehicle, as viewed by the first vehicle; transmitting a request message to the second vehicle, the request message requesting measurement data from the second vehicle; receiving, from the second vehicle, a reply message comprising a second plurality of angles, the second plurality of angles comprising an angle of the first vehicle and an angle of the third vehicle, as viewed by the second vehicle; and determining, according to the first plurality of angles and the second plurality of angles, a merged map, the merged map comprising a position of the first vehicle, a position of the second vehicle, and a position of the third vehicle.

In another aspect, there is non-transitory computer-readable media in a second vehicle in traffic comprising a first vehicle and at least one other vehicle, the media containing instructions that when implemented by a computing environment cause a method to be performed, the method comprising: receiving, from the first vehicle, a request for geometric traffic data; determining one or more "visible" vehicles, the visible vehicles being visible to the second vehicle; measuring, for each of the visible vehicles, an angle of the visible vehicle and a distance of the visible vehicle from the second vehicle; transmitting, to the first vehicle, a message comprising the measured angles and the measured distances; and receiving, from the first vehicle, a merged map comprising positions of the first vehicle, the second vehicle, and the at least one other vehicle.

In another aspect, there is a computer containing an artificial intelligence structure, the artificial intelligence structure comprising; one or more inputs, each input comprising an angle or a distance corresponding to a vehicle in traffic, the traffic comprising a plurality of vehicles; one or more internal functions, each internal function operably linked to one or more of the inputs; and an output operably linked to the one or more of the internal functions, the output comprising a two-dimensional position of each vehicle of the plurality.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1:
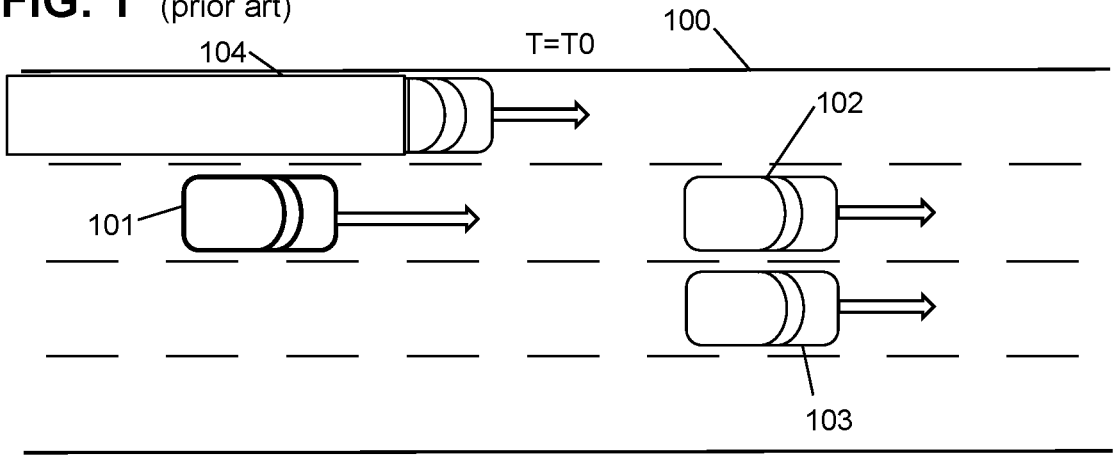
FIG. 1 is a sketch showing a vehicle collision, according to prior art.
Figure 1:
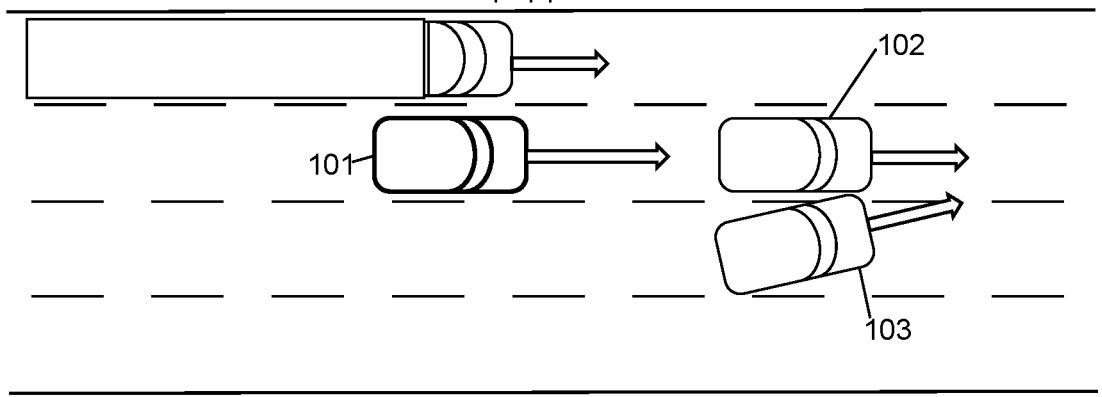
Figure 1:
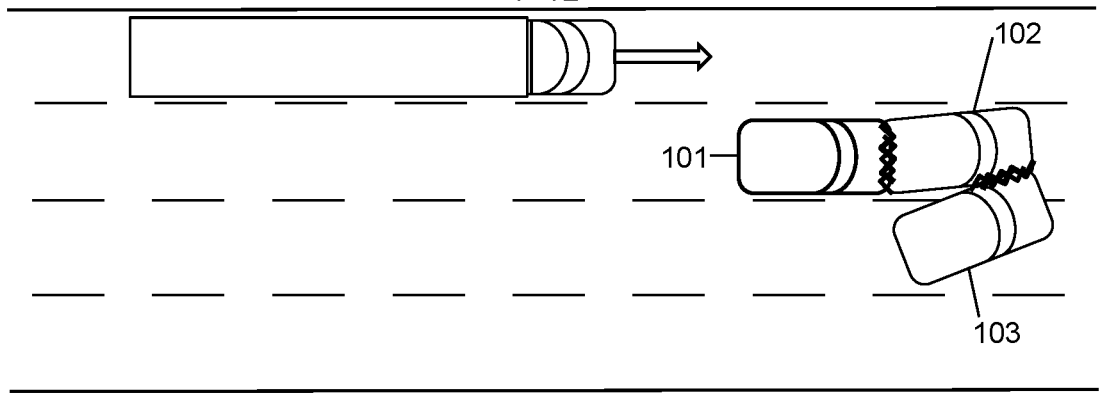

Disclosed herein are procedures enabling autonomous and semi-autonomous vehicles in traffic to determine the wireless addresses of other proximate vehicles. Systems and methods disclosed herein (the "systems" and "methods", also occasionally termed "embodiments" or "arrangements", generally according to present principles) can provide urgently needed wireless communication protocols to reduce traffic fatalities, facilitate traffic flow, and provide V2V communication options appropriate for 5G and 6G technologies, according to some embodiments.

Autonomous and semi-autonomous vehicles are potentially able to provide greatly increased vehicle safety by communicating with other vehicles to mutually react to an imminent collision and coordinate their actions to avoid the collision. By exchanging messages at electronic speeds, computer-operated vehicles can coordinate their actions, cooperatively adjust their speed and direction, and thereby avoid almost all types of highway accidents, saving countless lives. For such coordination, each vehicle must be able to transmit a message to another specific vehicle, such as the vehicle directly in front, which requires that the transmitting vehicle know the wireless address of the other vehicle. It is generally assumed that GPS or another satellite-based navigation system can provide sufficient localization to identify the vehicles, but this is incorrect. While satellite-based signals can indicate crude positions, they generally cannot provide meter-scale or sub-meter scale resolution required for vehicle selectivity unless multiple signal measurements are acquired and averaged, but averaging is not feasible while the vehicle is in motion at, typically, 30 m/s speeds. Moreover, satellite coverage is spotty in dense urban environments, steep canyons, and many other places where collision avoidance is needed. As an alternative, it may be assumed that 5G and 6G technologies, using high frequencies and directional antennas, can direct transmissions to a specific vehicle, but that is also incorrect unless large phased-array antennas are included in each autonomous vehicle. Moreover, high-frequency beams are notoriously prone to reflections from nearby conducting objects, such as vehicles in dense traffic, further confusing the single-vehicle selectivity. In addition, even if the beam is well-collimated, the wave energy propagates beyond the intended target and can be received by another vehicle in the same direction. Therefore, it remains an open question how vehicles will cooperate to avoid collisions in the future.

The systems and methods disclosed herein include a process termed "map-merging" in which multiple fragmentary "local maps" are combined into a comprehensive "merged map". In addition, the wireless addresses of specific vehicles in a merged map may be included, thereby forming a "traffic map" of the local traffic. Vehicles can determine, from the traffic map, which other vehicles in view are associated with which wireless address, and thereby can communicate with the other vehicles specifically.

For example, a first vehicle can measure the distances and angles toward other vehicles in view, thereby creating a local map of only the vehicles visible to the first vehicle. (As used herein, a second vehicle is "visible" or "in view" to a first vehicle if an sensor on the first vehicle can detect the second vehicle and measure the angle of the second vehicle relative to a coordinate system.) The first vehicle can transmit a "request" message requesting that each receiving vehicle should measure the angles and distances of other vehicles in view, and return the data to the first vehicle. Alternatively, the first vehicle may measure the angles and distances of the other vehicles first, and then include that data in the request message, along with its wireless address. A second vehicle, receiving the request message, can then make another local map from its own point of view, by measuring the angles and distances of vehicles in its view. Usually, the second vehicle's local map may include some of the vehicles in the first vehicle's local map. The second vehicle can then transmit its data back to the first vehicle in a "reply message" which includes the angle-distance data from the second vehicle, as well as the second vehicle's wireless address. The first vehicle or the second vehicle, or another one of the proximate vehicles, can then compare the first and second local maps, adjusting the relative position of the two maps for best fit or correlation of the vehicle locations common to the two local maps. By aligning the local maps according to the commonly-viewed vehicle positions, the maps are thereby merged. The merged map may be termed a "traffic map" since it contains vehicle positions as well as wireless addresses, when known.

Local maps from multiple vehicles may be merged in this way, encompassing more vehicles and, usually, improving the location accuracy. In some cases, it may not be possible to measure one or more of the distances, in which case the angle data may be sufficient to merge the local maps, especially if the same vehicle is viewed by multiple other vehicles from different directions. After calculating the traffic map including the wireless addresses when known, the first vehicle can then distribute the traffic map by broadcasting the vehicle locations relative to a coordinate system, along with each vehicle's wireless address. Each of the vehicles can determine from the traffic map the locations of vehicles in proximity, and also their wireless addresses when known. Hence, each participating vehicle can then cooperate for traffic management, collision avoidance, and other valuable tasks.

The merged traffic map may be in the form of a list of two-dimensional positions of each vehicle in view, or other form of providing the position and address data that a receiving vehicle can interpret to determine where each vehicle is located and what each vehicle's wireless address is. For example, a Cartesian coordinate system may have the X axis parallel to the road and the Y axis perpendicular. The origin of the coordinate system may be at the first vehicle, or centered on the roadway, or at the right shoulder, for example. Importantly, each vehicle may then determine, from the merged traffic map, which of the other vehicles in view is associated with which wireless address, so that the vehicles can then communicate specifically with each other, to avoid hazards and regulate the flow of traffic.

The traffic map may also indicate the positions of non-responsive vehicles, such as human-driven vehicles, and can indicate that they are not accessible wirelessly. Whichever vehicle produces the traffic map can then broadcast the latest traffic map, in which each vehicle position is annotated with the vehicle's wireless address. Thus any vehicle receiving the traffic map, containing relative positions of the first and second vehicles as well as other vehicles in view, can communicate unicast (specifically addressed) messages to each other, and can thereby cooperate in managing safety hazards and traffic flow.

The systems and methods further include providing feature data, besides the distance and angle measurements, about the proximate vehicles. For example, the feature data may include the type of vehicle observed (sedan, delivery van, pickup truck, sports car, motor cycle, semi-trailer, etc.) and/or the color and/or characteristic visible features (convertible with top down, SUV with cargo on roof, car pulling a boat, etc.) along with other vehicle features suitable for identification. Such additional information may facilitate the map merging and vehicle localization steps.

The systems and methods further include a frequency or a band of frequencies allocated for vehicles to exchange messages, such as messages that provide location data and wireless addresses. Such a "localization channel" may be configured according to a wireless technology standard. For example, the localization channel may be a 5G/6G sidelink channel, configured either in "mode-1" (managed by a base station, such as a roadside access point) or "mode-2" (managed by one of the vehicles, without base station involvement). Communications on the localization channel may be at-will and without apparent management, such as Wi-Fi or other short-range communication protocol. Wireless messages on the localization channel may be limited, by convention for example, to no more than a specified transmission power level, which may be sufficient for communicating short distances on a roadway such as a few hundred meters, but not high enough to interfere with more distant users. Wireless messages may employ a specified modulation scheme, such as QPSK (quad phase-shift keying) which includes phase modulation but not amplitude modulation. Avoiding amplitude modulation may provide ease of demodulating messages from moving vehicles in traffic. Alternatively, messages may be modulated in QAM (quadrature amplitude modulation, which includes both amplitude and phase modulation) such as 16QAM (with 16 valid states), 256QAM, etc. A demodulation reference may be included, or provided separately, to assist the receiver in interpreting the message. Messages may be half-duplex (transmit and receive sequentially) and TDD (time-division duplexing) and time-spanning (occupying sequential time elements at a single frequency) for ease of reception. Alternatively they may be full-duplex (transmit and receive on separate frequency bands) and FDD (frequency-division duplexing) and frequency-spanning (occupying multiple frequencies or subcarriers at a single time element).

As used herein, a "map" is a two-dimensional representation of points, each point having a location which may be specified by a distance and an angle, or Cartesian coordinates, or other coordinates, relative to a central point such as a vehicle making the distance and angle measurements. Thus a list or table of coordinate values may be termed a map herein. A vehicle "knows" something if the vehicle includes a processor which has the relevant information. An "autonomous" vehicle is a vehicle operated by a processor, with little or no human control most of the time. A "semi-autonomous" vehicle is a vehicle at least partially operated by a processor, or which can be fully operated by a processor temporarily, such as during emergency intervention. A wireless message is "unicast" if it is addressed specifically to a particular recipient, and "broadcast" if it is transmitted without specifying a recipient. Each modulated resource element of a message is termed a "modulated message resource element", or more simply as a "message element" herein. Further terms will be defined as needed in examples.

Turning now to the figures, FIG. 1 is a sketch showing a vehicle collision, according to prior art. A 4-lane highway 100 is shown at three times T0, T1, and T2, occupied by a first, second, and third vehicle 101-102-103 depicted as cars, and a semi-trailer 104. All vehicles are traveling to the right, as indicated by arrows. The first vehicle 101 is outlined in bold to indicate that it is the one transmitting. All three cars 101-103 are autonomous vehicles and all are in radio contact with each other on a sidelink or V2V channel.

At T0, the first vehicle 101 recognizes that it is traveling too fast and is likely to hit the second vehicle 102. The first vehicle 101 cannot switch to the left lane because the truck 104 is in the way. It doesn't make sense to shift to the right because then the third vehicle 103 is in the way, and there is no time to reach the rightmost lane. Therefore vehicle 101 transmits an emergency message, intended for the second vehicle 102, instructing it to immediately and forcefully shift to the left, to avoid a collision. Unfortunately, the first vehicle 101 has incorrectly determined which vehicle is in front, due to the poor spatial resolution of GPS and the poor angular precision of directional beamforming. The wireless address which the first vehicle 101 thinks belongs to the second vehicle 102, instead belongs to the third vehicle 103. Therefore, when the first vehicle 101 transmitted the collision-avoidance instruction, the message was actually received by the third vehicle 103 instead of the second vehicle 102. Consequently, at T1 the third vehicle 103 immediately performs the instructed left-turn emergency maneuver, and strikes the second vehicle 102. At T3, the first vehicle 101 collides with the second vehicle 102 since the second vehicle 102 is still blocking the way. All three vehicles are badly damaged, as indicated by crunch marks. In fact, they will be lucky to avoid being hit again by the approaching truck 104. The cause of the collision was the mistaken determination, by the first vehicle 101, of which vehicle had which wireless address. The ultimate source of the collision was the insufficient spatial resolution of GPS which cannot reliably discriminate two adjacent vehicles traveling at high speed on a freeway.

Figure 2:
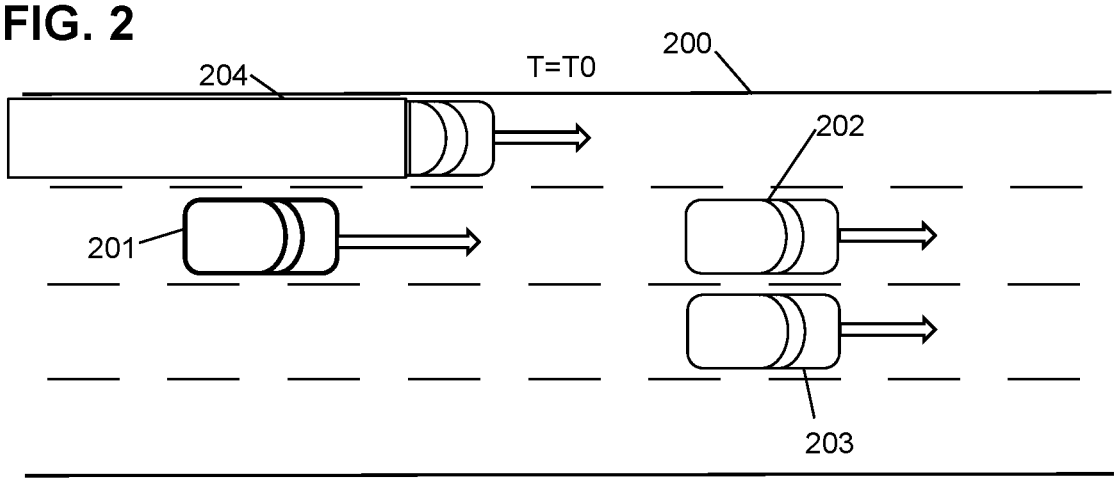
FIG. 2 is a sketch showing an exemplary embodiment of a procedure for vehicles to avoid a collisions, according to some embodiments.
Figure 2:
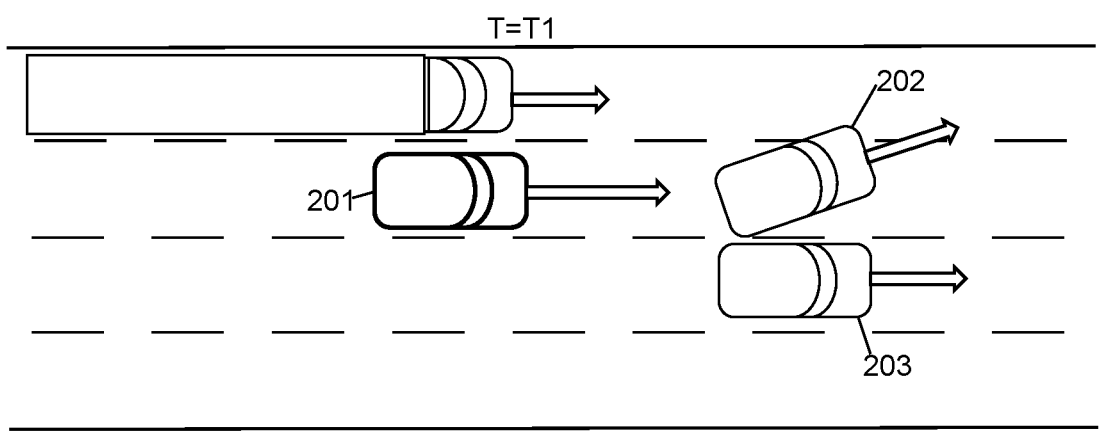
Figure 2:
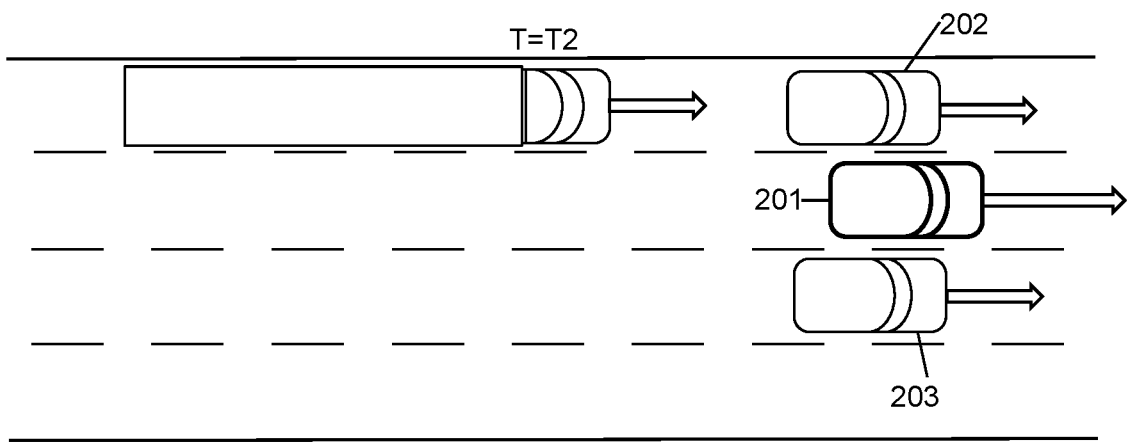

FIG. 2 is a sketch showing an exemplary embodiment of a procedure for vehicles to avoid collisions, according to some embodiments. As depicted in this non-limiting example, the freeway 200, and the first, second, and third vehicles 201-202-203 and the truck 204 are as described with FIG. 1, however this time the first vehicle 201 has determined the correct wireless addresses of the second and third vehicles 202, 203 according to the systems and methods disclosed herein. At T0, the first vehicle 201 transmits the emergency collision-avoidance message for an immediate left shift, but this time using the correct wireless address of the second vehicle 202. Accordingly, at T1, the second vehicle 202 dodges left into the leftmost lane. At T2, the second vehicle has completed the change, and the first vehicle passes safely through the gap. The third vehicle 203 then sends the first vehicle 201 a message expressing gratitude for using an effective technology to correctly identify and localize each vehicle, instead of relying on an ineffective means for determining which wireless address belongs to which vehicle in view.

Figure 3:
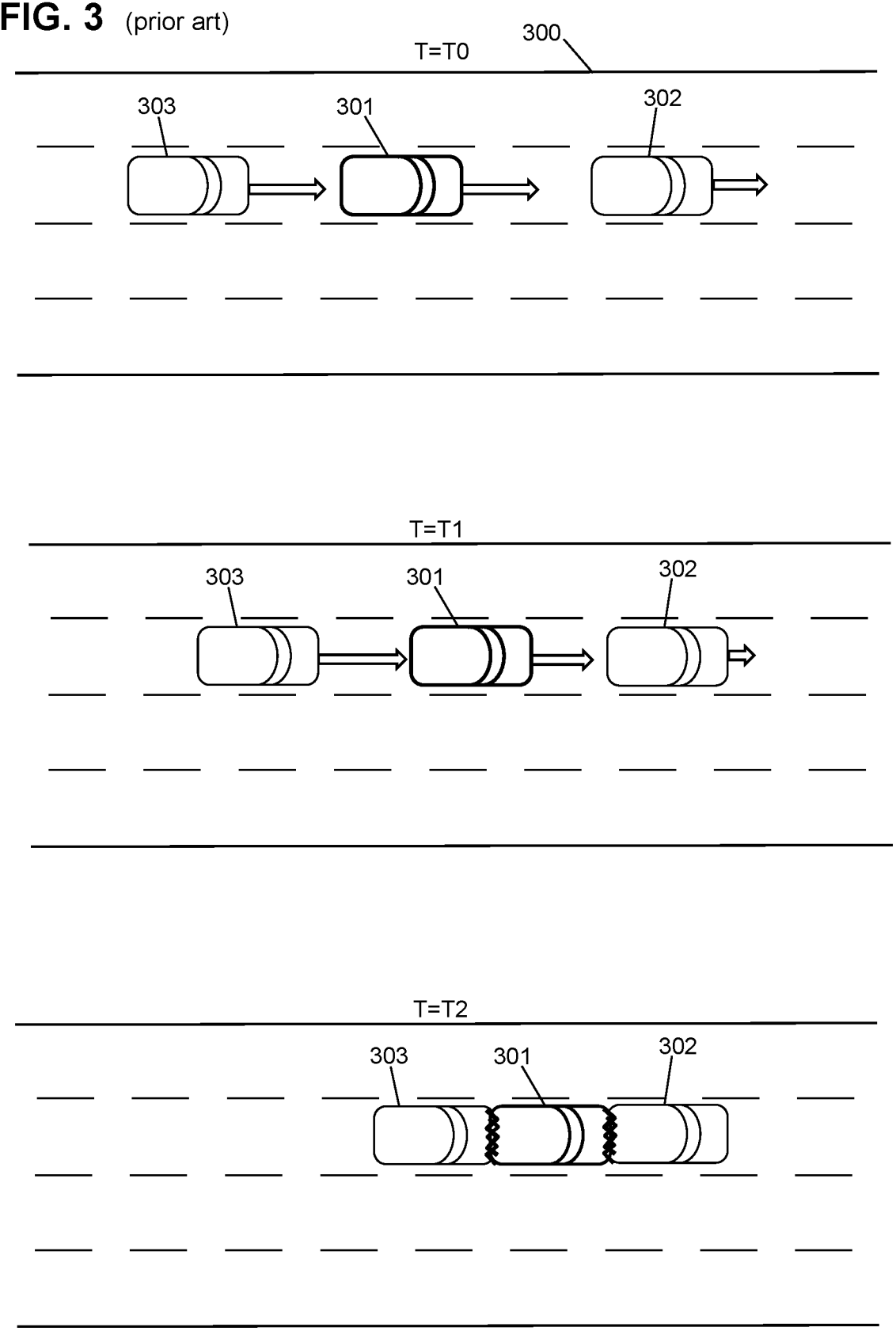
FIG. 3 is a sketch showing three vehicles colliding, according to prior art.

FIG. 3 is a sketch showing three vehicles colliding, according to prior art. A highway 300 includes a first, second, and third vehicle 301-302-303 in line. At T0, the first vehicle determines that it is traveling faster than the second vehicle 302 and immediately begins to slow down. To avoid being rear-ended by the third vehicle 303, the first vehicle 301 transmits an emergency message "slow down immediately!" to the wireless address that the first vehicle 301 thinks belongs to the third vehicle 303, and another emergency message "speed up immediately" to the wireless address that the first vehicle 301 thinks belongs to the second vehicle 302. Unfortunately, in this case those addresses were misallocated, and they actually belong to the opposite vehicles. The error is due to the poor longitudinal resolution achievable in a moving GPS receiver. Consequently, the third vehicle 303 received an emergency command to speed up and the second vehicle 302 got an emergency command to slow down.

At T1, the second vehicle 302 has obligingly slowed down further, as directed by the emergency message, while the third vehicle 303 has accelerated to high speed, as instructed. At T2, the first vehicle 301 has smashed into the second vehicle 302 and the third vehicle 303 has smashed into the first vehicle 301. The cause of this accident was that the first vehicle 301 had misallocated the wireless addresses to the two other vehicles, resulting in sending the emergency messages to the wrong vehicles. The ultimate source was the poor longitudinal resolution of satellite-based locations when moving at high speed.

Figure 4:
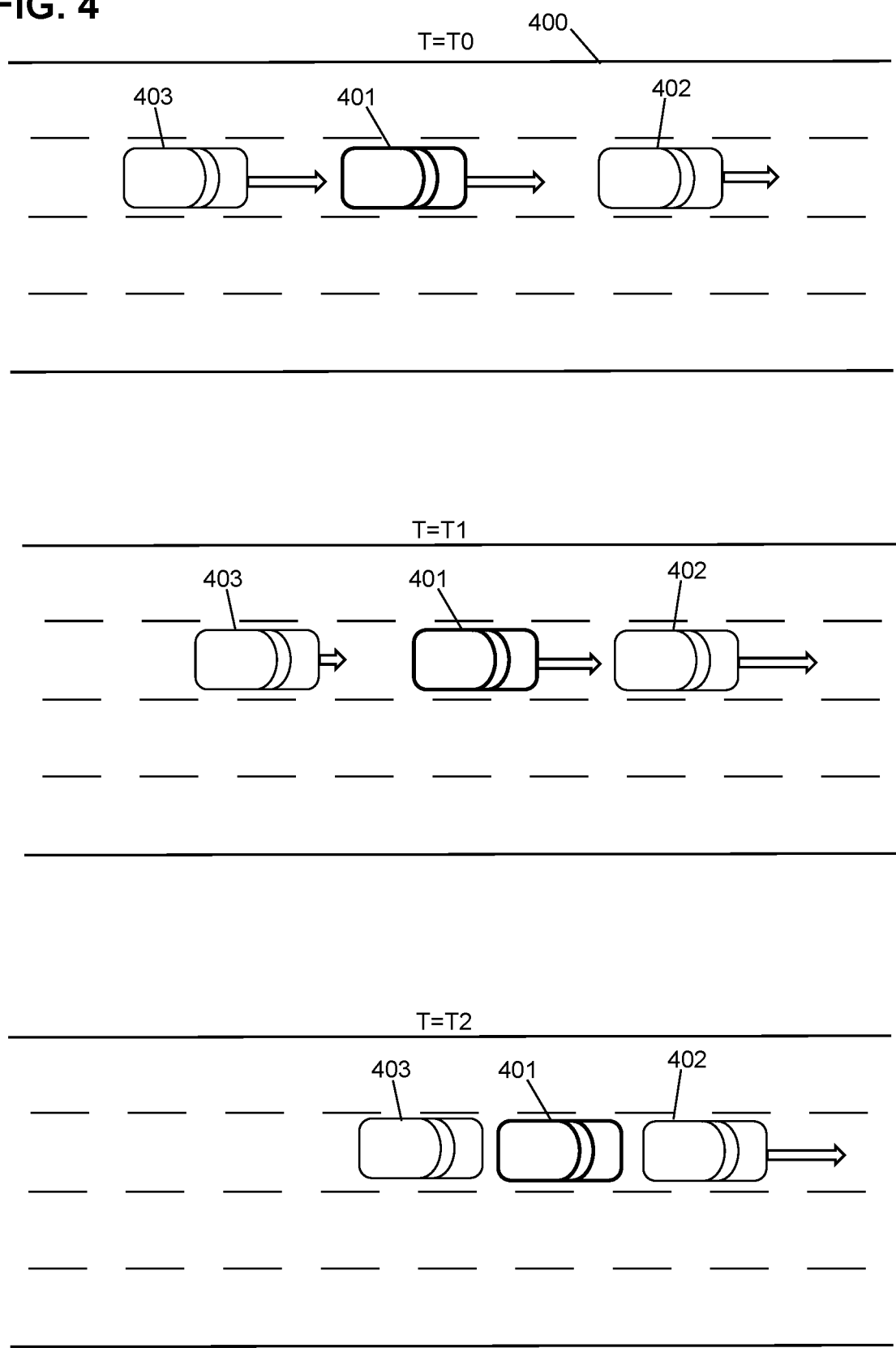
FIG. 4 is a sketch showing an exemplary embodiment of a procedure for three vehicles to avoid a collision, according to some embodiments.

FIG. 4 is a sketch showing an exemplary embodiment of a procedure for three vehicles to avoid a collision, according to some embodiments. As depicted in this non-limiting example, a first, second, and third vehicle 401-402-403 are in line on a highway 400 when, at T0, the first vehicle 401 determines that it is going faster than the second vehicle 402 and begins to slow down. To avoid being rear-ended, the first vehicle 401 sends an emergency message to the third vehicle 403 to slow down, and another emergency message to the second vehicle 402 to speed up. The first vehicle 401 knows the correct wireless address of the second and third vehicles 402-403 because, at an earlier time, all three vehicles exchanged mapping data including distances and angles of each vehicle in view, along with their own wireless address, and thereby determined which vehicle had which wireless address. Accordingly, the third vehicle 403 receives the emergency message correctly addressed to it and, at T1, has begun slowing down as directed. Likewise, the second vehicle 402 has received the acceleration request and has speeded up, giving the others crucial extra seconds to decelerate.

At time T2, the first and third vehicles 401-403 have decelerated to match the second vehicle 402, thereby avoiding colliding. Thus a collision can be avoided (or at least mitigated) in almost every case by cooperative action among the participants, and this depends on each participant knowing which wireless address belongs to which vehicle in view.

Figure 5:
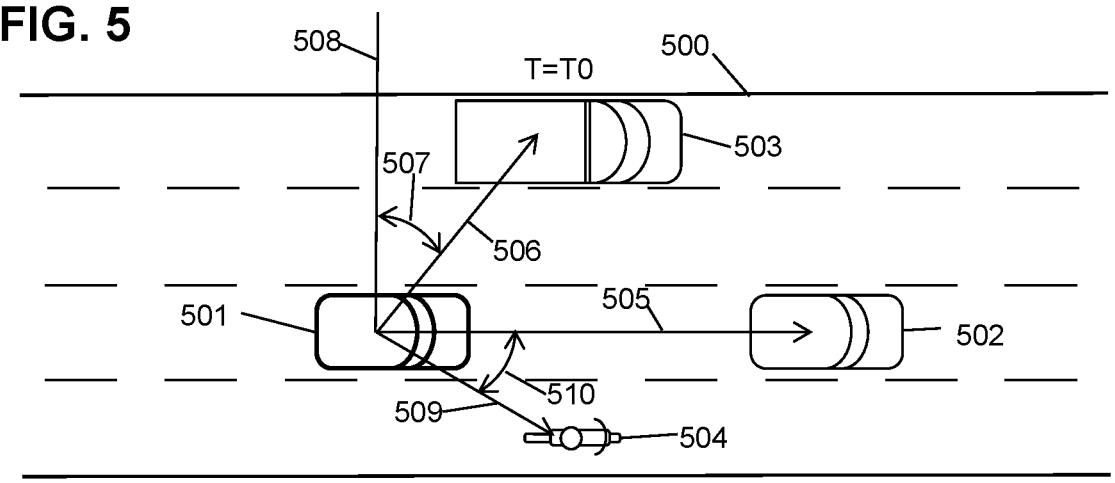
FIG. 5 is a sketch showing an exemplary embodiment of a procedure for vehicles to identify each vehicle's wireless address, according to some embodiments.
Figure 5:
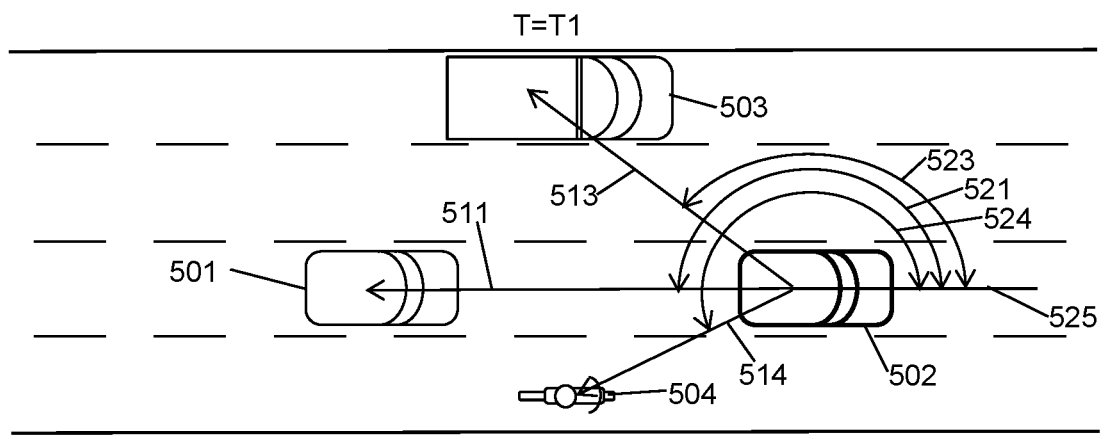
Figure 5:
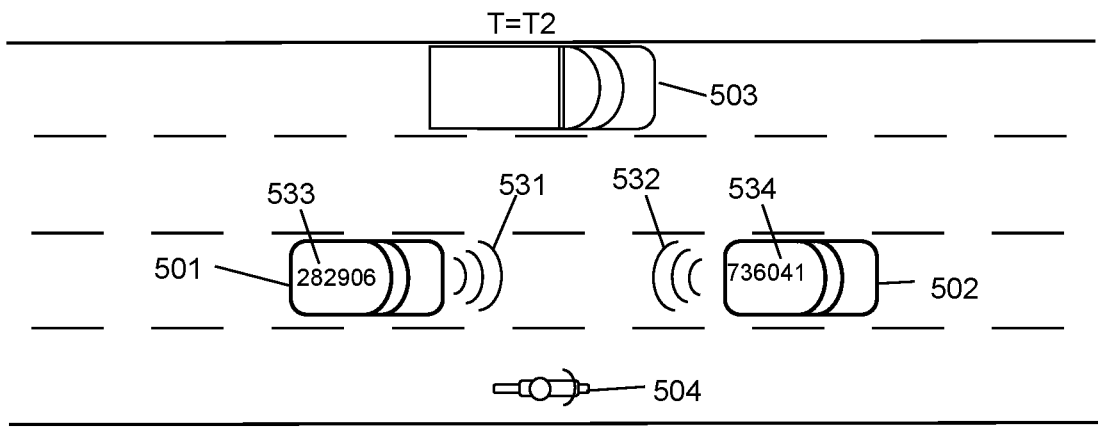

FIG. 5 is a sketch showing an exemplary embodiment of a procedure for vehicles to identify other vehicle's wireless address, according to some embodiments. As depicted in this non-limiting example, a method for vehicles to construct their local maps of traffic in view is described, along with a method for the vehicles to then merge their local maps with other maps received from other vehicles, to determine the correct wireless addresses of the various participating vehicles. At time T0, a first and second vehicles 501-502 depicted as cars, a third vehicle 503 shown as a pickup truck, and a fourth vehicle 504 shown as a motorcycle, are arrayed in lanes of a freeway 500. At time T0, the first vehicle 501 measures the distance 505 and angle to the second vehicle 502. In this case, the angle is relative to the direction of travel and is zero since the first and second vehicles 501, 502 are in the same lane. The first vehicle 501 measures the distance to the second vehicle 502 using, for example, radar or lidar, which generally determines a distance from the front of a vehicle to the back of another vehicle. However, the first vehicle 501 has corrected the measurement 505 to equal the distance from the centroid of the first vehicle 501 to the centroid of the second vehicle 502, to facilitate map merging later. For example, a processor can add the known additional distance to the center of the first vehicle 501, plus an estimated distance to the center of the second vehicle 502, so that the final distance 505 is center-to-center as desired.

The first vehicle 501 also measures the distance 506 and angle 507 of the third vehicle 503. In this case, the angle is relative to north 508, which is up in the sketch. The first vehicle may have an electronic compass or other means to determine north.

The first vehicle 501 also measures the distance 509 and angle 510 to the fourth vehicle 504. In this case, the angle 510 is relative to the orientation (or direction of travel) of the first vehicle.

Thus the figure illustrates three possible ways of reporting an angle measurement. If the road is straight and the vehicles are traveling straight along the road, then the angles can be measured in any of the three ways depicted, or other ways, as long as the vehicles all measure their angles consistently so that their maps can be merged without rotations or other corrections. However, if the road is curved, then the angle measurements will be affected since each vehicle will be pointed in a slightly different direction, and each vehicle's direction will be changing with time. In that case, the map merging may require angular adjustments as well as longitudinal and lateral displacements, adding uncertainty. Preferably, a convention may be established as to the manner of making the angular measurements, such as measuring on a straight section of the road while the measuring vehicle is traveling straight and the target vehicle is not changing lanes. Also the convention may select the measurement basis, such as all angles being relative to the direction of the road. Such a convention may reduce uncertainties, provide for consistent measurements by various vehicles, and facilitate merging those measurements to determine which vehicle has which wireless address.

At T1, the second vehicle 502 performs its measurements on the vehicles in its view. The second vehicle 502 measures the distance 511 to the first vehicle 501, the distance 513 to the third vehicle 503, and the distance e 514 to the fourth vehicle 504. The second vehicle 502 also measures the angle 521 to the first vehicle 501, the angle 523 to the third vehicle 503, and the angle 524 to the fourth vehicle 504, all relative to the direction of travel 525. Thus the direction of travel 525 is a line or plane passing centrally through the measuring vehicle from back to front, in some embodiments.

At T2, the first and second vehicles 501, 502 exchange messages 531 and 532 specifying their own wireless addresses 533, 534 and the various distances and angles that they have measured. Optionally, they may include in the messages (or separate messages) features of the vehicles in view, such as the second vehicle 502 specifying that the vehicle at angle 521 is a car, the vehicle at angle 523 is a pickup truck, and the vehicle at angle 524 is a motorcycle, thereby assisting the first vehicle 501 in correlating the data in the second vehicle's message 532 with the first vehicle's map. The first and second vehicles 501, 502 then compare their own local maps with the data contained in the messages 532 and 531 which they received, sliding the maps laterally and longitudinally until the locations of the vehicles that they both observe can become aligned. The first and second vehicles 501, 502 then can determine, from the merged map and the stated wireless addresses 533, 534 which vehicle is associated with which wireless address. They can also determine that the third and fourth vehicles 503, 504 are not in wirelessly communication, which could be a valuable bit of knowledge if cooperative action is subsequently needed for collision avoidance. Thus the sketch of T2 represents the merged traffic map obtained by the first and second vehicles 501, 502.

If the third vehicle 503 is at least semi-autonomous and is wirelessly connected, then it too can perform the distance and angle measurements on vehicles in its view, and can receive the broadcast messages 531 and 532 from the other vehicles, and by map-merging can determine the wireless addresses of the first and second vehicles 501, 502. Then, the third vehicle 503 can broadcast its own message containing its wireless address and the list of distances and angles as measured, and thereby enable the first and second vehicles 501, 502 to determine the correct wireless address of the third vehicle 503. In general, the more vehicles contributing to the merged map, the more accurate it becomes, and the more wireless addresses can be correlated with physical vehicles in view. Moreover, when a vehicle is obscured from one vehicle's view but is observed by another vehicle, then the hidden vehicle will appear on the merged map, and the other vehicles can thereby determine its presence even if they cannot see it. Determining where hidden vehicles are present may enable the vehicles to avoid certain accidents.

Figure 6:
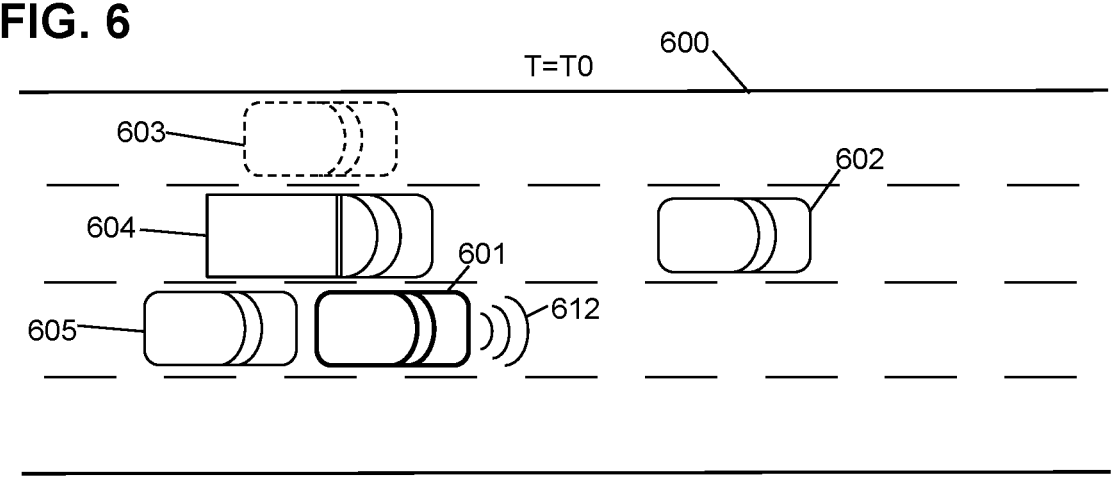
FIG. 6 is a sketch showing an exemplary embodiment of a procedure for vehicles to cooperatively develop a traffic map, according to some embodiments.
Figure 6:
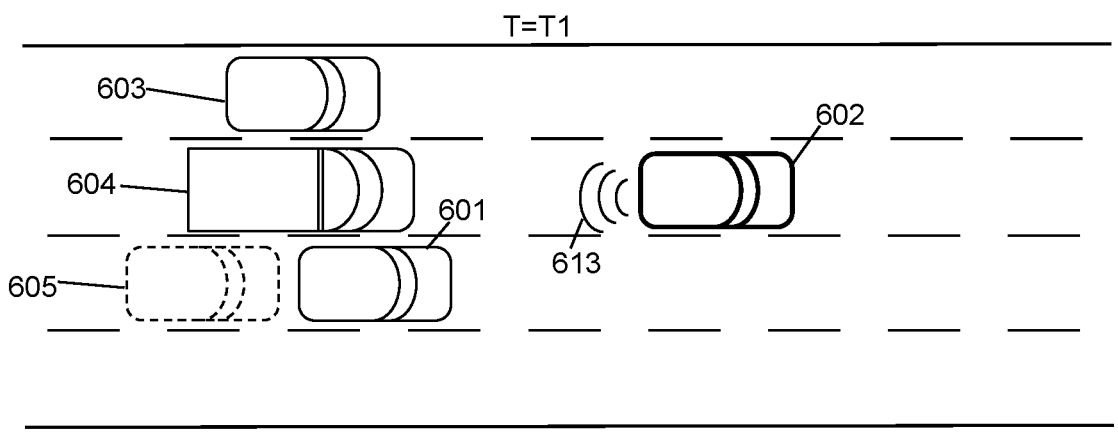
Figure 6:
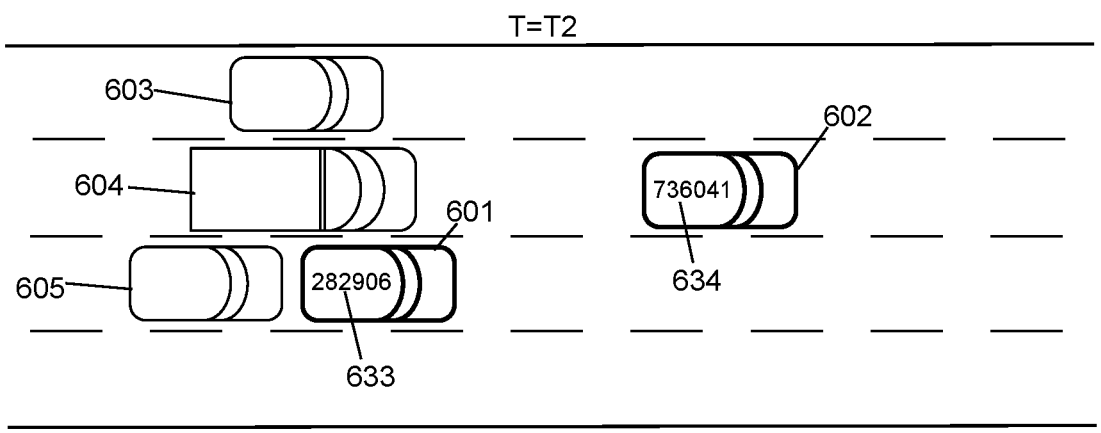

FIG. 6 is a sketch showing an exemplary embodiment of a procedure for vehicles to cooperatively develop a traffic map, according to some embodiments. As depicted in this non-limiting example, a highway 600 contains five vehicles. A first vehicle 601 measures the distances and angles of all the vehicles in its view, including vehicles 602, 604, and 605. Vehicle 603 is present but is not visible to the first vehicle 601, and hence is shown in dash. After making the measurements, the first vehicle 601 broadcasts a message 612 stating its wireless address and the list of distances and angles. Alternatively, the first vehicle 601 may prepare a list of coordinates such as Cartesian coordinates of each vehicle in view relative to the first vehicle 601, based on the angles and distances measured. It is immaterial whether the location data is reported in a polar or Cartesian coordinate system, or other coordinate system that the receiving vehicles can interpret.

At T1, a second vehicle 602 receives the first vehicle's message 612, and makes its own distance and angle measurements of the vehicles in view, which include vehicles 601, 603, and 604. The other vehicle 605 is obscured to the second vehicle 602 and thus is shown in dash at T1. The second vehicle 602 broadcasts its message 613 including its wireless address and its own list of distances and angles (or X,Y coordinates of the other vehicles, for example).

The first vehicle or the second vehicle, or both, then prepare a merged map by laterally and longitudinally translating the received local maps until the vehicles that they both observed are matched, within measurement uncertainties, and the associated wireless addresses are added. Their merged traffic map is then shown at time T2, including all the vehicles that were visible to either the first or the second vehicle 601, 602, and including the wireless addresses 633, 634 of the first and second vehicles 601, 602. The first or second vehicle may broadcast the traffic map thus determined, so that the other vehicles can also benefit from the information. For example, vehicle 603 may not be aware of either vehicle 601 or 605 due to the intervening truck 604. All of the visible vehicles are shown on the traffic map at T2, and hence none of them is now shown dashed. The first and second vehicles 601, 602 now know each other's locations and wireless addresses. The other vehicles may also know the locations and wireless addresses of the first and second vehicles 601, 602 by receiving their messages and correlating with their own distance and angle measurements. In addition, the other vehicles may broadcast their corresponding messages to join the communication group, and may thereby participate in future collision avoidance.

In another embodiment, the first or second vehicle 601, 602 may broadcast the traffic map formed by merging the local maps measured by the first and second vehicles. Other vehicles may then obtain the traffic map without having to perform the map merging. As more vehicles contribute their observations, the traffic map be updated and re-broadcast. As the vehicles move around on the highway, the participating vehicles may again measure their local maps, thereby enabling the traffic map to be updated.

Figure 7A:
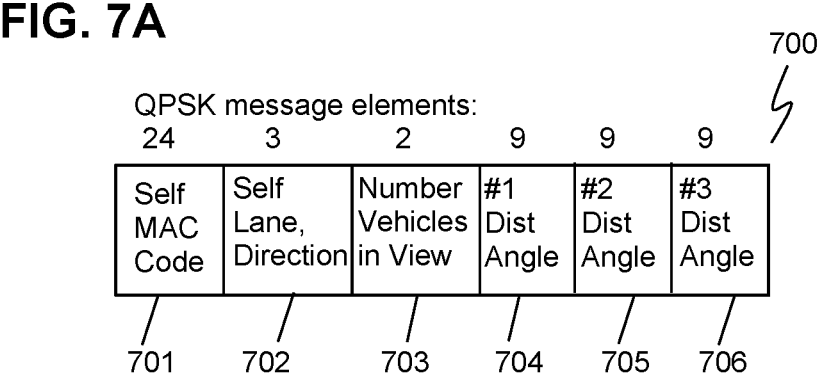
FIG. 7A is a schematic showing an exemplary embodiment of a message requesting vehicle locations, according to some embodiments.

FIG. 7A is a schematic showing an exemplary embodiment of a message requesting vehicle locations, according to some embodiments. As depicted in this non-limiting example, a request message 700, broadcast by a first vehicle, may explicitly or implicitly request geometric traffic data from other vehicles receiving the request message 700. The request message 700 may include the wireless address 701, such as a MAC (media access code) address, of the first vehicle, a code indicating the lane and travel direction 702 of the first vehicle, a number of vehicles 703 in view of the first vehicle, followed by the distances and angles of those vehicles 704-705-706. The sizes of the various fields, in QPSK message elements, is also shown for this example. A MAC address is generally 6 bytes or 48 bits, which can be transmitted in QPSK in 24 message elements, at two bits per modulated message resource element. Thus the length of the message 700 depends on the number of vehicles reported. For three vehicles in view, as shown here, the length of the message is 56 message elements. Other vehicles receiving the request message 700 may thereby determine that a reply message is requested, the reply message including angle and distance measurements by the receiving vehicle. In addition, the request message 700 may include a message-type field indicating that it is a request message and/or that receiving vehicles are requested to transmit a reply message.

Figure 7B:
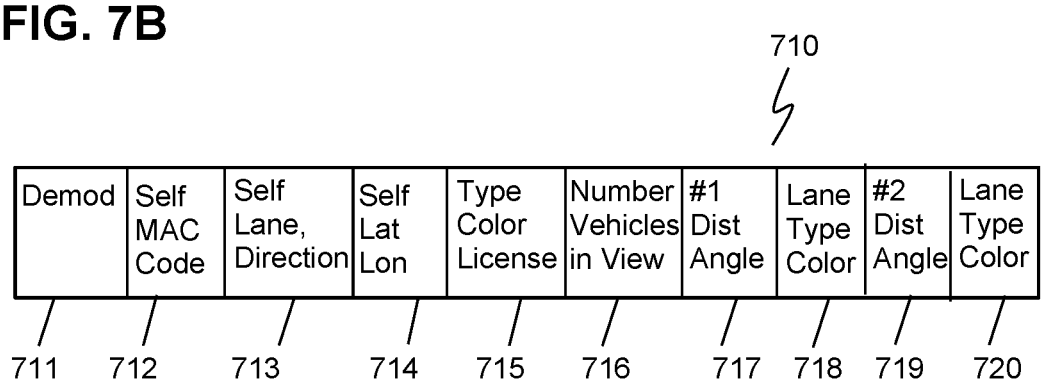
FIG. 7B is a schematic showing an exemplary embodiment of a message indicating vehicle locations, according to some embodiments.

FIG. 7B is a schematic showing another exemplary embodiment of a message indicating vehicle locations, according to some embodiments. As depicted in this non-limiting example, a request message 710 broadcast by a first vehicle may include a short demodulation reference 711 configured to assist a receiver in interpreting the message 710, the wireless address 712 of the first vehicle, a code 713 indicating which lane the first vehicle is in and which direction it is traveling, a field 714 containing the GPS latitude and longitude of the first vehicle, a code 715 indicating the type, color, and license of the first vehicle, then the number of vehicles being reported 716, followed by that number of entries, each entry being the distance and angle of a respective vehicle 717, 719, along with a code indicating the lane number, type, and color of each vehicle 718, 720.

The fields may be encoded for brevity. For example, the demodulation reference 711 may be just two message elements instead of the conventional 5G/6G DMRS (demodulation reference signal). The lane number and direction may be encoded as 3 bits for the lane number (thereby accommodating up to 8 lanes) and the direction in 3 more bits (four directions plus one reserved bit) totaling 3 QPSK message elements. The latitude and longitude field 714 may provide the first vehicle's GPS coordinates with about 1 meter resolution in a range of 1 km, which requires about 10 bits per coordinate. Since the V2V localization is intended to be highly local, ranging just a few hundred meters at most, a location range of 1 km may be sufficient to specify absolute locations in this application. The type of vehicle may be encoded in 8 categories (such as sedan/SUV, 2-seater, pickup truck, delivery van, semi trailer, motorcycle, bus, other), and the color may be selected from a limited palette of 8 basic colors (such as black, gray/silver, white/cream, brown/red, orange/yellow, green, blue, other) totaling 3 QPSK elements. The license plate may take more bits due to the large amount of information in up to seven alphanumeric characters, plus state/province. 21 message elements are allocated. The number of vehicles in view 716 is limited to 16, represented by 2 QPSK elements. Each vehicle in view may be characterized by its distance (1 meter resolution, 512 meters max, 9 bits), and angle (2 degree resolution, 360 degree range, 8 bits), plus its lane number (3 bits), type (3 bits), and color (3 bits), totaling 14 QPSK elements per vehicle including a couple of unused bits available for other features.

The reply messages may be formatted similarly to the request message 700 or 710 and may include the distances, angles, and other data of vehicles in view of the replying vehicles. Alternatively, the request message may be an indication that vehicle measurement data are requested from the receiving vehicle, without listing the measurement data obtained by the first vehicle. In that case, the first vehicle may be responsible for merging the local maps and broadcasting the merged map to the other vehicles.

Figure 7C:
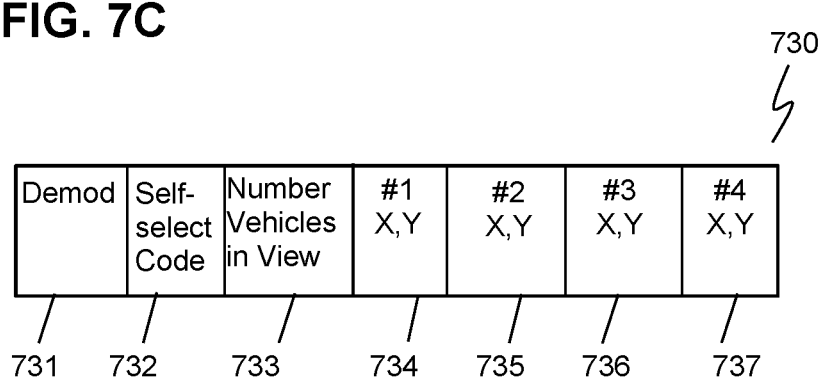
FIG. 7C is a schematic showing another exemplary embodiment of a message indicating vehicle locations, according to some embodiments.

FIG. 7C is a schematic showing another exemplary embodiment of a message indicating vehicle locations, according to some embodiments. As depicted in this non-limiting example, a message 730 indicating the distances and angles of other vehicles in view may include several fields, all optional. This message 730 can serve as the initial request message or one of the reply messages. Its shorter format, than that of FIG. 7B, may make it easier to convey. The fields include an initial short-form demodulation reference 731, a self-selected identification code 732 as described below, a number of vehicles in view 733, and the X and Y coordinates 734, 735, 736, 737 of each vehicle relative to the first vehicle, as calculated from the distances and angles to each of those vehicles. The self-selected identification code 732 may be a short random code (8 bits in this case) by which the vehicles can identify themselves and communicate unicast. It is not necessary, in many applications, to know the full MAC address of the vehicles. An 8-bit randomly-selected code may be sufficient to separately identify vehicles in view. In addition, if one of the vehicles notices that another participating vehicle has selected the same code, then one or both of them can select different codes and continue communicating thereafter. A vehicle that changes its code may broadcast a standard message to the others indicating the old and new code values.

The number of vehicles in view 733 is limited to sixteen here, since more values may become unwieldy, and rarely is traffic so dense that more than sixteen vehicles are in view. The distances and angles 734-737 may be encoded as described previously. The number of QPSK message resource elements needed for each field is shown.

As mentioned, the embodiments of FIGS. 7A, 7B, and 7C are non-limiting; artisans may devise message formats with different numbers and sizes of fields and different content from those depicted, without departing from the appended claims.

Figure 8:
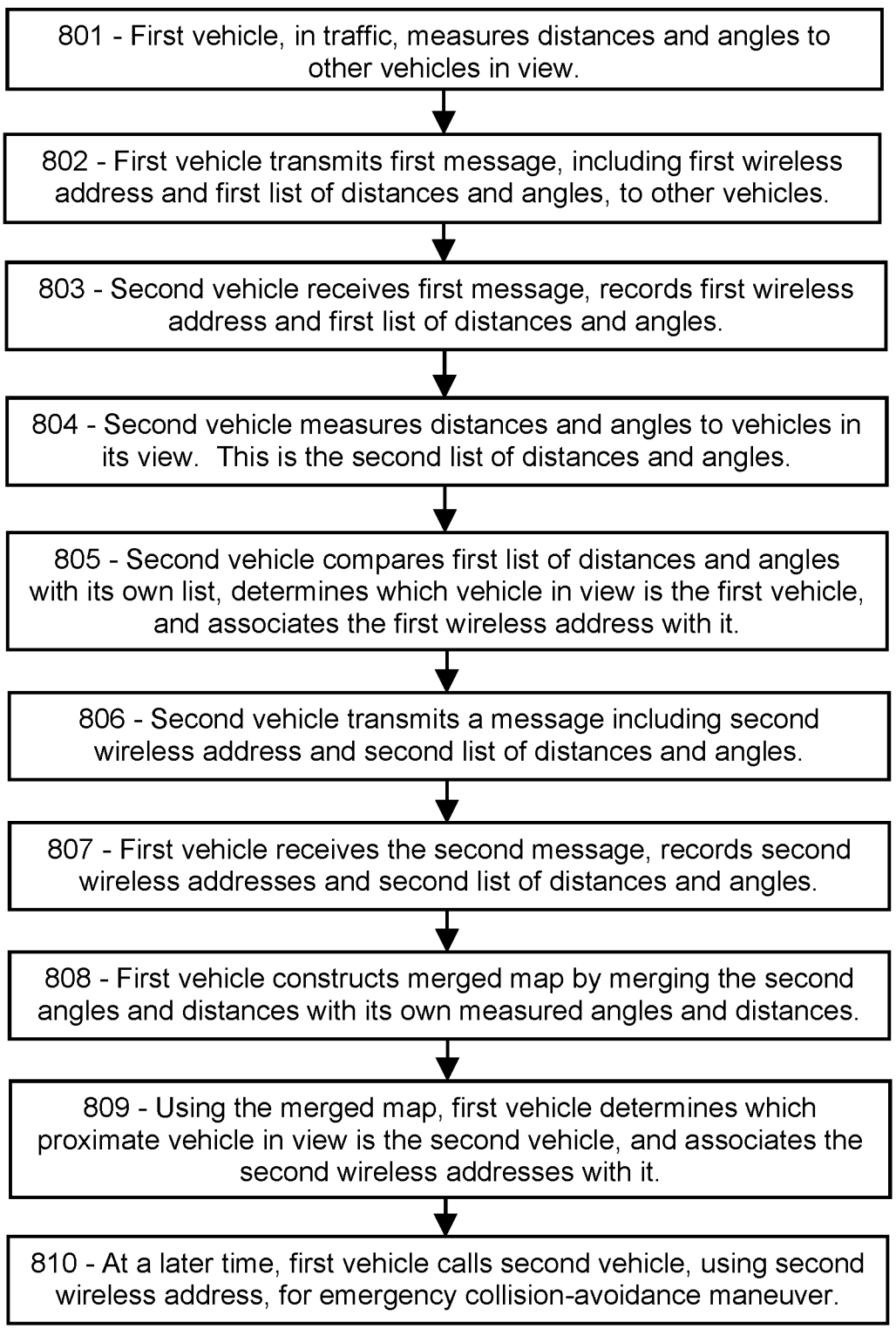
FIG. 8 is a flowchart showing an exemplary embodiment of a method for vehicles to determine locations and wireless addresses of other vehicles, according to some embodiments.

FIG. 8 is a flowchart showing an exemplary embodiment of a method for vehicles to determine the locations and wireless addresses of other vehicles, according to some embodiments. As depicted in this non-limiting example, two vehicles exchange distance and angle measurements to determine which vehicle in view is associated with which wireless address. At 801, a first vehicle measures the angles and distances of other vehicles in view, and then at 802 broadcasts the data, along with its wireless address, to other vehicles in range. At 803, a second vehicle receives the message and records the data, then at 804, the second vehicle measures the angles and distances of vehicles in its view, thereby preparing a second list of location data. At 805, the second vehicle compares the first and second lists, optionally as a 2-dimensional map or other calculation tool, and attempts to match vehicle positions in the two maps by translating one of the maps laterally and longitudinally to account for the different viewpoints of the first and second vehicles. If the first and second vehicles both observed the same vehicles in their maps, then a match should be possible. If so, the merged map indicates the various vehicles in view of either the first or second vehicles, and also indicates which of the vehicles in view is the first vehicle, and also provides the first vehicle's wireless address. Therefore, the second vehicle then knows how to contact the first vehicle.

At 806, the second vehicle broadcasts a second location message including its wireless address and its measurements of the distances and angles of the vehicles in view. At 807, the first vehicle receives the second location message, records the second vehicle's wireless address and the measurement data, and then at 808 the first vehicle merges the maps by correlating those vehicles that they both observed. At 809, the first vehicle thereby determines which vehicle is the second vehicle, and also its wireless address. Thereafter 810, the first or second vehicle may transmit unicast messages directly to each other, for example to cooperate in avoiding an imminent collision.

Map merging, based on fragmentary data from multiple viewpoints, is a complex problem. First of all, the relative positions of the various viewpoints are initially unknown, so each local map must be translated longitudinally and laterally to match with the other local maps. Secondly, each local map includes a different subset of vehicles in the region. Thirdly, there may be other fragmentary data available, such as the vehicle types and colors, which lane of a multilane highway, and special features. In addition, some of the vehicles may have GPS data available, which may be useful despite its limitations. For problems of this complexity, artificial intelligence (AI) may be well-suited. The following examples disclose systems and methods for using AI to determine the traffic map.

Figure 9A:
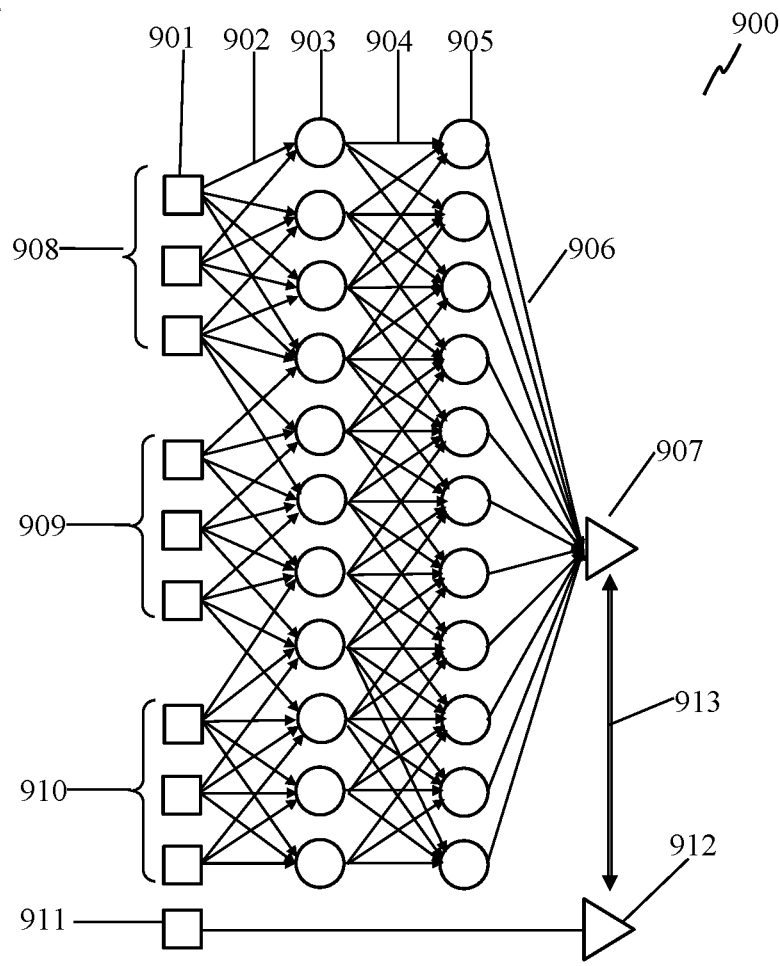
FIG. 9A is a schematic showing an exemplary embodiment of an AI structure for correlating input geometrical data and generating a merged map output, according to some embodiments.

FIG. 9A is a schematic showing an exemplary embodiment of an AI structure for correlating input geometrical data and generating a merged map output, according to some embodiments. As depicted in this non-limiting example, an AI structure 900, such as a neural net, may be programmed in a computer. The AI structure 900 generally includes a plurality of inputs depicted as squares 901, internal functions depicted as circles 903 and 905, and one or more outputs depicted as a triangle 907. Directional links 902 convey inputs 901 to the internal functions 903, and further links 904 convey processed data between layers of internal functions 905, and further links 906 convey processed data to the output 907. Each internal function 903, 905 may include mathematical and/or logical operations on the data provided to it, and may then provide processed data to the next layer or the output. The output 907 may include a merged map indicating the calculated two-dimensional positions of the various vehicles whose distances and angles were provided as input to the structure, and may include, associated with some of the vehicle positions, a wireless address of the corresponding vehicle. The output 907 may be in the form of a list or table that shows the position of each vehicle represented in the inputs 901 and its wireless address if known. The position may be listed as the latitude and longitude of each vehicle, or as distances parallel and perpendicular to the road direction relative to one of the vehicles, or other suitable tabulation of the positions and wireless addresses of the vehicles in view.

Although the figure shows links connecting only a few of the internal functions in each layer, in an actual AI structure the inputs and internal functions may be linked to all of the internal functions in the next layer. In addition, in some embodiments, a feedback link (not shown) carrying processed data back to a previous layer, may be included. The AI structure 900 may have many more layers than shown. Each internal function 903, 905 may include one or more adjustable variables that can be adjusted to optimize the output 907 according to the application. Links may also have weighting or other functionality, which also may be varied, in some embodiments.

The inputs 901 may include a variety of data types. For the geometrical map merging application, the inputs 901 may include the angles and distances of the various vehicles in view, as measured by each participating vehicle, collectively labeled as 908. The inputs 901 may include GPS data acquired by each of the vehicles, including resolution (if known), and optionally corrected for the vehicle's motion since the acquisition time (if known), collectively labeled as 909. The inputs 901 may include encoded descriptions of the vehicles such as vehicle type and color, lane position, and any special features that may enhance recognition by the other vehicles, labeled as 910.

In addition, a special input 911 is the actual distribution of vehicles, determined independently of the angle-distance measurements, such as by an overhead camera. The special input 911 is not provided to the AI structure 900, but instead is used as the "ground truth" 912 for comparison 913 with the predicted output map 907. The accuracy of the prediction 907 may then be evaluated according to the number of correct vehicle positions in the predicted output 907. The adjustable variables in the internal functions 903, 905 may be adjusted to improve the accuracy of the predictions, and thereby convert the AI structure into an AI "model" simulating or predicting the vehicle positions in traffic. After analyzing a large number of cases and adjusting or "tuning" the variables to incrementally improve the predictions, the output 907 may provide a traffic map with acceptable accuracy.

An algorithm may be developed from the AI model, for field use by vehicles in traffic. Since vehicles generally lack supercomputers, the algorithm may be a smaller and simpler version of the AI structure (with unnecessary links and functions discarded, for example). Alternatively, the algorithm may be a different type of analysis device, such as a computer subroutine, an interpolatable tabulation of values, or other calculation means for merging fragmentary local maps and subsidiary information into a comprehensive map of traffic in a region, according to some embodiments.

Optionally, the vehicles may record the input data and the predicted traffic map in, for example, a memory, and may then test the map by observing the vehicles as they subsequently move around, and may thereby verify the predicted map, or may uncover errors in the predicted map. The vehicles may then transfer the recorded data and predictions to the AI model for further refinement. If an improved version of the algorithm becomes available, it may be downloaded to the vehicles for subsequent use, according to some embodiments.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide especial advantages to solving AI models because they can very rapidly explore a complex terrain of values, such as the highly interrelated effects of the various inputs on the output results. Therefore, the systems and methods include a quantum computer programmed to include an AI structure and trained on wireless message data to merge map fragments acquired or measured by each of several vehicles in traffic, and to prepare a comprehensive map of the vehicles, and optionally fixed items, detected by the vehicles.

Figure 9B:
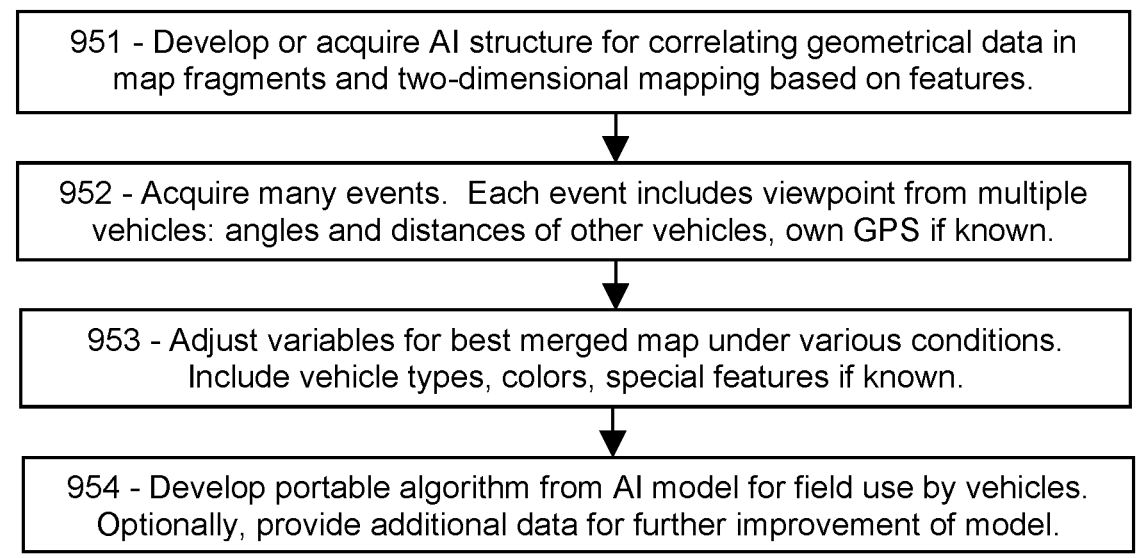
FIG. 9B is a flowchart showing an exemplary embodiment of a procedure for producing an AI-based merged map, according to some embodiments.

FIG. 9B is a flowchart showing an exemplary embodiment of a procedure for producing an AI-based merged map, according to some embodiments. As depicted in this non-limiting example, at 951 an AI structure, such as a neural net or other suitable AI structure, is provided in a computer such as a supercomputer. The AI structure is suitable for correlating geometrical data, in this case two-dimensional map fragments, and generating a merged map, which generally includes all of the vehicles listed in the fragmentary maps. At 952, an AI model is developed by training the adjustable variables in the AI structure according to traffic events, preferably a large number of traffic events spanning a wide range of situations. Each traffic event, in this case, may include the angles and distances of each proximate vehicle as viewed from each other vehicle. Each participating vehicle thereby acquires the geometrical data using sensors on each of the participating vehicles. The data may also include codes indicating the type of vehicle, the color, special features of each vehicle if known, each vehicle's own GPS data if known, its lane position, and other data as may be acquired. At 953, the adjustable variables in the AI structure are varied incrementally, and the predicted map output is compared to the actual traffic distribution. The adjustable variables may then be varied further, or varied differently, or otherwise adjusted to improve the predictive accuracy of the model. At 954, after satisfactory accuracy has been achieved under a sufficient range of traffic situations, an algorithm may be derived from the AI model for use by the vehicles in determining the traffic distribution from the fragmentary local maps and other data as available. As mentioned, the vehicles may continue to record traffic data for further refinement of the model.

Figure 10A:
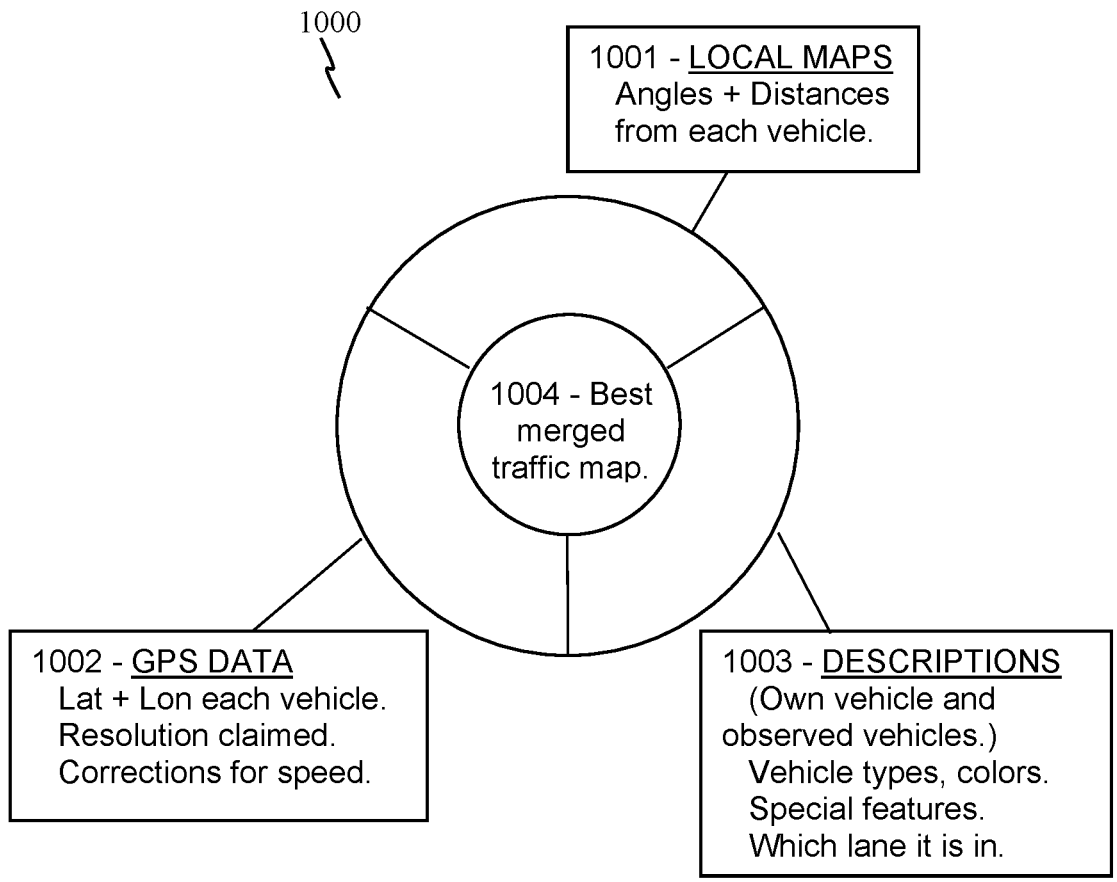
FIG. 10A is a schematic showing an exemplary embodiment of data for determining a traffic map, according to some embodiments.

FIG. 10A is a schematic showing an exemplary embodiment of input data for determining a traffic map, according to some embodiments. As depicted in this non-limiting example, input data 1000 for an AI model may include local maps 1001 acquired by each vehicle, consisting of the measured angles of the other vehicles in view, relative to a particular direction such as the roadway direction. The local maps 1001 may also include distances measured between the vehicles if available. Each local map 1001 may include an identification code, such as a wireless address, of the vehicle making the measurements, so that the output merged map can indicate the wireless address of each vehicle in traffic.

The input data 1000 may also include GPS data 1002, or location data from another satellite-based navigation system, or a land-based navigation system configured to provide the position (such as latitude and longitude) of each vehicle. If available, the GPS data 1002 may include the resolution claimed for the position data. Since the vehicles are generally moving, the position data may be corrected for the distance covered by the vehicle during time elapsed after the GPS data was acquired, based on the vehicle's speedometer and a compass, for example.

The input data 1000 may also include descriptive types of data 1003, such as the types of vehicles (both the subject vehicle and each observed vehicle), their colors, which lane each vehicle is in, and any special visible features such as "loaded roof-rack" or "smoky exhaust" which may help other vehicles to recognize them.

The input data 1000 may be processed in the AI model, or an algorithm derived therefrom, to produce as output a "best" merged traffic map 1004, wherein best means the most accurate prediction of the traffic so far achievable based on the adjustment of variables in the model.

Figure 10B:
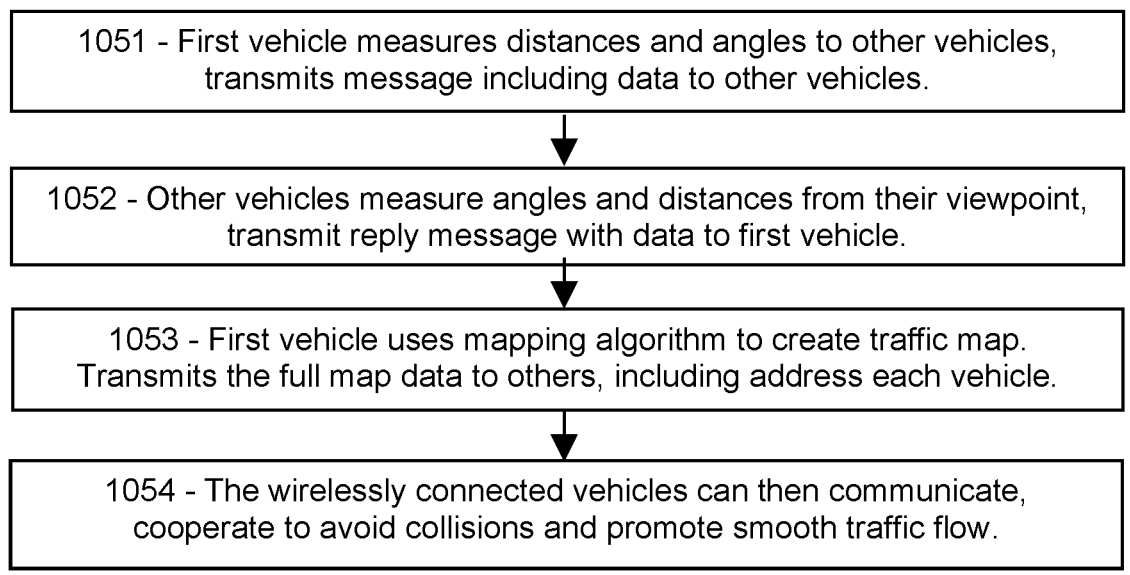
FIG. 10B is a flowchart showing an exemplary embodiment of a procedure for using an AI algorithm to determine a traffic map, according to some embodiments.

FIG. 10B is a flowchart showing an exemplary embodiment of a procedure for using an AI algorithm to determine a traffic map, according to some embodiments. As depicted in this non-limiting example, at 1051 a first vehicle measures the angles and, optionally, the distances to other vehicles in view, and optionally other information such as vehicle type and color, which lane, and the like. The first vehicle transmits this information, along with its own address code, to other vehicles in proximity. At 1052, the other vehicles make similar measurements from their viewpoint and transmit their data to the first vehicle and the other vehicles in range. At 1053, the first vehicle, and optionally the other vehicles as well, produces a merged traffic map by combining the data from other vehicles with its own measurements. The first vehicle may use an AI-derived algorithm to convert the fragmentary mapping and descriptive data items into an integrated two-dimensional merged traffic map of the vehicle positions in the region. In addition, the first vehicle, or the algorithm implemented by the first vehicle, may include the wireless addresses of the various vehicles in the merged traffic map so that the various vehicles can then communicate specifically with each other. In addition, the merged traffic map may include the positions of non-participating vehicles that have not provided wireless addresses or position data, based on the observations of the other vehicles from multiple viewpoints. The first vehicle may transmit the map, in a suitable format, to the other vehicles, including the wireless address of each vehicle if known. Then at 1054, each of the participating vehicles can communicate unicast with each other. Importantly, each vehicle can identify which of the vehicles in view has which wireless address, according to the map, and therefore can collaborate in avoiding traffic hazards and promoting the smooth flow of traffic.

The systems and methods disclosed herein may enable autonomous and semi-autonomous vehicles in traffic to specifically identify other vehicles, that is, to determine which wireless address corresponds to which visible vehicle in proximity. The vehicles may thereby cooperate to manage the flow of traffic, avoid hazards, minimize energy consumption, and many other advantages, according to some embodiments. In addition, the merged traffic map may enable better driving options than the single-viewpoint local map visible to each vehicle individually, for example by revealing vehicles that may be obscured from one vehicle's viewpoint. The apparatus needed to implement these systems and methods may already be present on autonomous and semi-autonomous vehicles, in the form of cameras, radar and lidar systems, and other sensors that acquire the data needed to drive the vehicle, as well as wireless transmitters and receivers. By addition of the software needed to merge the local maps, using the algorithm for example, each vehicle can obtain the full traffic map, without adding or modifying equipment on the vehicle, and at minimal cost associated with the software download, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the vehicle, an inserted memory chip, hard drive, flash drives, flash memory, optical media, magnetic media, or any other type of file-storing medium. The outputs may be delivered to a user by way of signals transmitted to vehicle steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where vehicle controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a first vehicle to communicate with a second vehicle, the second vehicle proximate to a third vehicle, the method comprising:
   a. measuring a first plurality of angles, the first plurality of angles comprising an angle of the second vehicle and an angle of the third vehicle, as viewed by the first vehicle;
   b. transmitting a request message to the second vehicle, the request message requesting measurement data from the second vehicle;
   c. receiving, from the second vehicle, a reply message comprising a second plurality of angles, the second plurality of angles comprising an angle of the first vehicle and an angle of the third vehicle, as viewed by the second vehicle; and
   d. determining, according to the first plurality of angles and the second plurality of angles, a merged map, the merged map comprising a position of the first vehicle, a position of the second vehicle, and a position of the third vehicle.

2. The method of claim 1, wherein the request message and the reply messages are transmitted according to 5G or 6G technology.

3. The method of claim 1, wherein the angles are measured relative to a direction of a road occupied by the first and second vehicles.

4. The method of claim 1, further comprising:
   a. measuring a third plurality of distances, the third plurality of distances comprising a distance from the first vehicle to the second vehicle and a distance from the first vehicle to the third vehicle;
   b. receiving, from the second vehicle, a fourth plurality of distances, the fourth plurality of distances comprising a distance from the second vehicle to the first vehicle and a distance from the second vehicle to the third vehicle; and
   c. determining the merged map according to the first plurality of angles, the second plurality of angles, the third plurality of distances, and the fourth plurality of distances.

5. The method of claim 4, wherein the request message further indicates the first plurality of angles and the third plurality of distances, and the reply message further indicates the second plurality of angles and the fourth plurality of distances.

6. The method of claim 1, further comprising:
   a. determining, according to the reply message, a color or a vehicle type, or both, of the second vehicle;
   b. comparing the color or vehicle type, or both, of the second vehicle to each of the vehicles visible to the first vehicle; and
   c. determining the merged map according to the color or vehicle type, or both, of the second vehicle.

7. The method of claim 1, wherein:
   a. the request message further indicates a wireless address of the first vehicle and at least one of a GPS location, a vehicle type, a color, or a lane position of the first vehicle; and
   b. the reply message further indicates a wireless address of the second vehicle and at least one of a GPS location, a vehicle type, a color, or a lane position of the second vehicle.

8. The method of claim 1, wherein the merged map further comprises a wireless address of the first vehicle and a wireless address of the second vehicle.

9. The method of claim 1, further comprising transmitting the merged map to the second vehicle and the third vehicle.

10. The method of claim 1, further comprising:
   a. determining that a traffic collision with the second vehicle is imminent;
   b. determining, according to the merged map, which wireless address corresponds to the second vehicle; and
   c. transmitting, to the second vehicle, an emergency message.

11. The method of claim 1, wherein the merged map includes a fourth vehicle which is not visible to the first vehicle.

12. The method of claim 1, further comprising:
   a. measuring data comprising angles and distances of vehicles in traffic, relative to the first vehicle, and angles and distances of further vehicles in the traffic, relative to the second vehicle;
   b. providing the data to a computer containing an artificial intelligence model; and
   c. determining, according to the artificial intelligence model, a merged map comprising predicted positions of the vehicles.

13. The method of claim 11, further comprising:
   a. measuring further data comprising angles and distances of further vehicles in traffic;
   b. receiving at least one message from at least one proximate vehicle, the at least one message comprising additional data comprising angles and distances of vehicles visible to the proximate vehicle or vehicles;
   c. providing the further data and the additional data as input to the algorithm; and
   d. determining, as output from the algorithm, the merged map.

14. Non-transitory computer-readable media in a second vehicle in traffic comprising a first vehicle and at least one other vehicle, the media containing instructions that when implemented by a computing environment cause a method to be performed, the method comprising:
   a. receiving, from the first vehicle, a request for geometric traffic data;
   b. determining one or more "visible" vehicles, the visible vehicles being visible to the second vehicle;
   c. measuring, for each of the visible vehicles, an angle of the visible vehicle and a distance of the visible vehicle from the second vehicle;
   d. transmitting, to the first vehicle, a message comprising the measured angles and the measured distances; and
   e. receiving, from the first vehicle, a merged map comprising positions of the first vehicle, the second vehicle, and the at least one other vehicle.

15. The media of claim 14, the method further comprising:
   a. determining, for each of the visible vehicles, a vehicle type or a vehicle color; and
   b. transmitting, to the first vehicle, a message comprising the determined vehicle types or vehicle colors.

16. The media of claim 14, the method further comprising transmitting, to the first vehicle, a wireless address of the second vehicle.

17. The media of claim 16, wherein:
   a. the merged map further indicates, in association with the position of the second vehicle, the wireless address of the second vehicle; and
   b. the merged map further indicates, in association with the position of the first vehicle, a wireless address of the first vehicle.

* * * * *